June 30, 1925.
D. R. CAPES
1,543,664
BRAKE OPERATING MEANS FOR VEHICLES
Filed Oct. 14, 1922 2 Sheets-Sheet 1
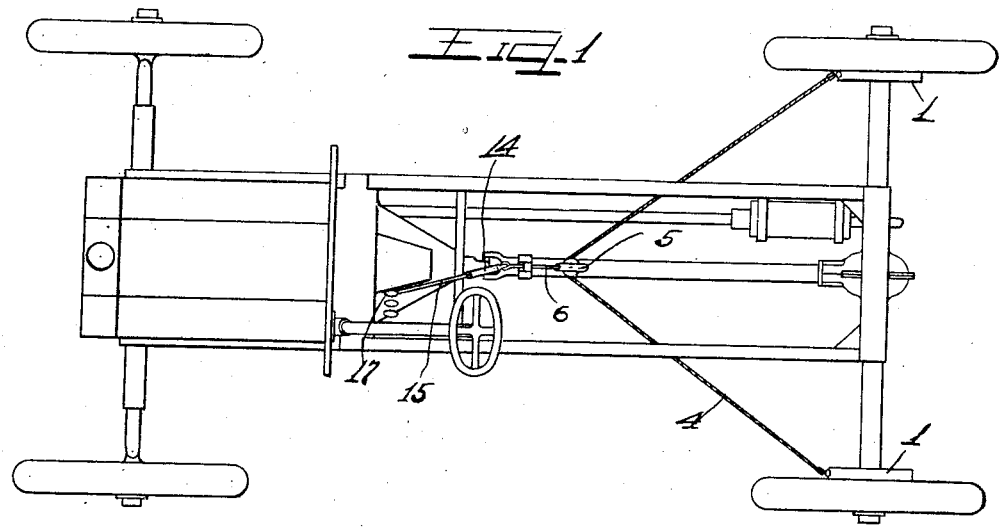
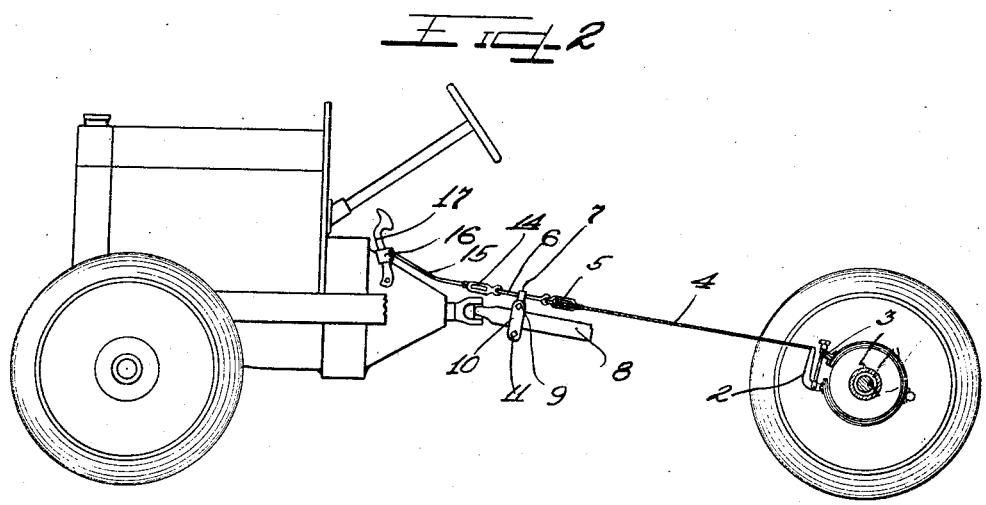
Witnesses
Inventor
DELBERT R. CAPES
by
Atty.

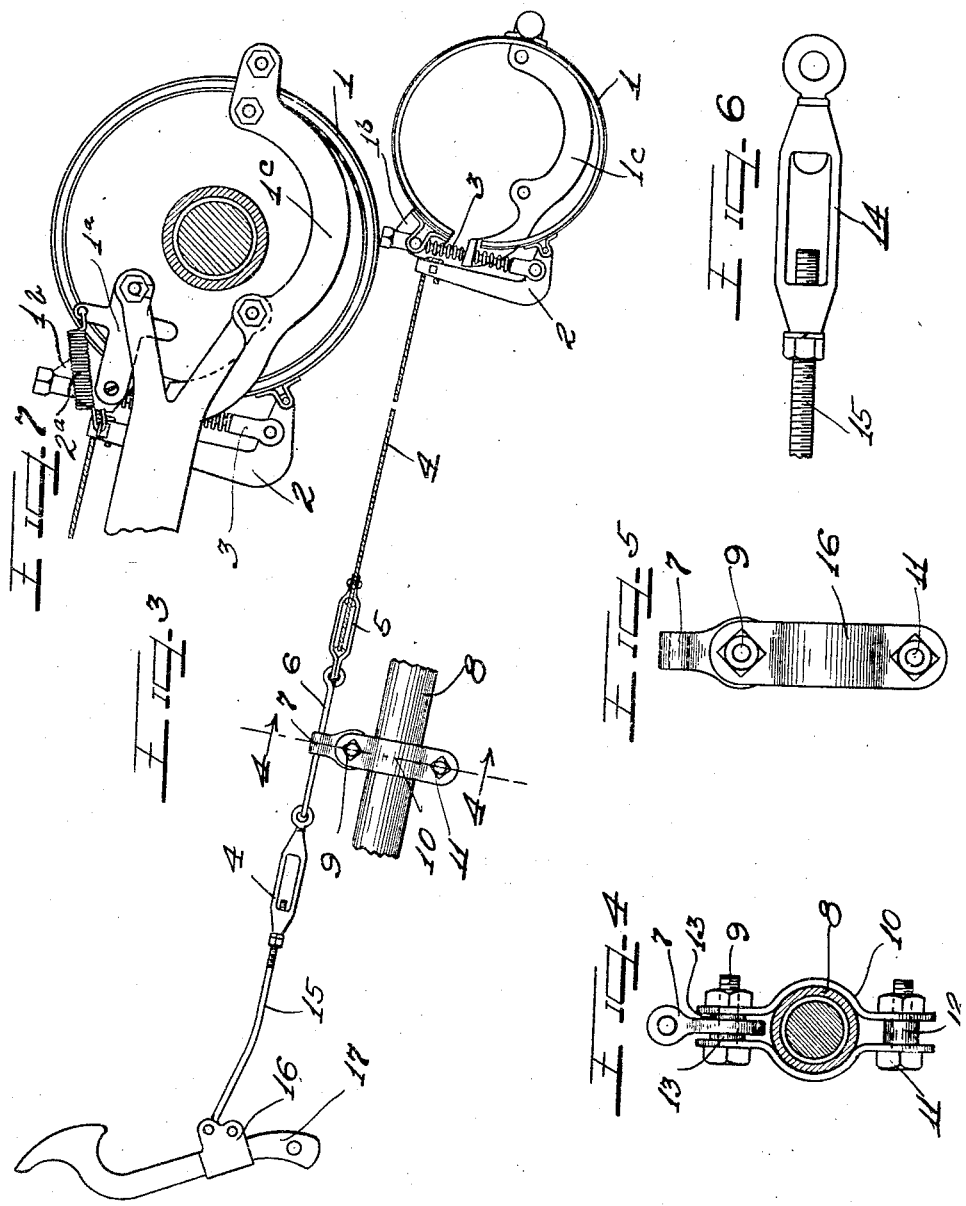

Patented June 30, 1925.

1,543,664

UNITED STATES PATENT OFFICE.

DELBERT R. CAPES, OF CHICAGO, ILLINOIS.

BRAKE-OPERATING MEANS FOR VEHICLES.

Application filed October 14, 1922. Serial No. 594,451.

*To all whom it may concern:*

Be it known that I, DELBERT R. CAPES, a citizen of the United States, and a resident of the city of Chicago, in the county of Cook and State of Illinois, have invented certain new and useful Improvements in a Brake-Operating Means for Vehicles; and I do hereby declare that the following is a full, clear, and exact description of the same, reference being had to the accompanying drawings, and to the numerals of reference marked thereon, which form a part of this specification.

This invention relates to a brake operating means for vehicles and comprises means for retaining the brake and equalizing mechanism adapted for attachment to the brakes on the rear wheels, of the vehicle and connected to a foot pedal adjacent one side of the automobile, the equalizing mechanism being so guided that the pull exerted thereon will always be in a true longitudinal direction with respect to the vehicle.

This invention comprises the novel mechanism and combinations hereinafter described and more particularly pointed out and defined in the appended claims.

In the accompanying drawings which illustrate a preferred embodiment of this invention and in which similar reference numerals refer to similar features in the different views:

Figure 1 is a top plan view of the chassis of an automobile of the Ford type.

Figure 2 is a side elevation thereof.

Figure 3 is an elevational view of the brake operating mechanism detached from the automobile.

Figure 4 is a section on the line 4—4 of Figure 3 upon an enlarged scale.

Figure 5 is a side elevational view of the clamp shown in Fig. 4 upon an enlarged scale.

Figure 6 is an enlarged plan view of the turn buckle for adjusting the connection from the equalizing mechanism to the foot pedal.

Figure 7 is an enlarged view of the brake with its novel appurtenances.

As shown on the drawings:

In referring now to the different figures of the drawing, it will be observed that the brake drums on the rear wheels are equipped with band brakes 1 the ends of which are respectively connected to a form of bell crank lever 2 and a spring pressed link 3 which is connected to the lever 2 so that pull upon the upper end of the lever 2 will draw the ends together applying the brake thereby. The brake band 1 is retained upon the drum by means of a retaining guide member 1$^a$ pivoted at one end to the bolt that secures the brake drum to the reach rod with its other end projecting beyond the periphery of the drum, and bolted to a co-operating retaining guide member 1$^b$ mounted on the brake band and projecting from the opposite side of the drum. A spring 2$^a$ connects the guide member 1$^a$ with the lever 2 for retaining the latter in normal inoperative position. The brake is retained in position by means of a bracket 1$^c$ secured to the brake at one end and bolted to the drum rear axle housing and reach rod intermediate its ends.

The two brakes are adapted to be simultaneously operated by an equalizing cable 4 which is trained over a sheave 5 with the ends thereof connected to the upper ends of the levers 2. The forward end of the sheave 5 is connected to a link 6 which passes through a guide 7 supported on the casing 8 of the transmission shaft of the vehicle.

The guide 7 comprises a member having an eye or loop at its upper end through which the link 6 passes and in which it is guided for exerting a straight longitudinal pull upon the sheave 5, the guide member being pivoted for rotation upon the upper bolt 9 of a clamp 10 which embraces both sides of the casing 8 and is clamped thereon by a bolt 11 connecting the lower ends of the clamp, a suitable collar or washer 12 being preferably placed over the bolt 11 between the arms of the clamp for properly spacing the same in this clamped position. And washers 13 are placed on the bolt 9 between the guide member 7 and the arms of the clamp so that the guide member may be constrained from lateral movement.

The forward end of the link 6 is connected to a turn buckle 14 which has an adjustable screw threaded connection with a rod 15 which is pivotally connected at its forward end to a sleeve or clamp 16 upon the foot pedal 17.

It will be noted that the foot pedal 17 is positioned to one side of the line of pull of the link 6 so that the expended force in applying the brake will be composed of a longitudinal component and a transverse component. This transverse component will however be resisted by the pivoted guide 7 so that a straight forward pull will always be exerted upon the sheave 5 and equalizing cable 4.

With this construction, the clamp 10 can be readily applied to the casing on the transmission shaft without drilling any holes and the pivotal guide 7 supported thereon can readily adjust itself if need be in a longitudinal direction according to the pull on the line 4. It will be noticed that the force exerted on the brake pedal 17 is directly transmitted to the brakes, which are guided in their movements by the guide members.

I am aware that numerous details of construction may be varied through a wide range without departing from the principles of this invention, and I therefore do not purpose limiting the patent granted otherwise than necessitated by the prior art.

I claim as my invention:

In a brake operating mechanism, a brake band, lever mechanism for contracting said brake band, guide members projecting on opposite sides of said band, and a spring connecting said lever mechanism with one of said guides for normally retaining the same in inoperative position.

In testimony whereof I have hereunto subscribed my name in the presence of two subscribing witnesses:

DELBERT R. CAPES.

Witnesses:
 FRED E. PAESLER,
 OSCAR HARTMANN.